United States Patent [19]
Takada et al.

[11] Patent Number: 5,112,109
[45] Date of Patent: May 12, 1992

[54] SLIDING SEAT BOTTOM INTERCONNECTED WITH BACK HAVING HINGED UPPER AND LOWER SEAT BACKS

[75] Inventors: Naoyuki Takada, Kanagawa; Hironobu Murakami, Kanagawa, both of Japan

[73] Assignee: Ikeda Bussan Co., Ltd., Ayase, Japan

[21] Appl. No.: 451,174

[22] Filed: Dec. 15, 1989

[30] Foreign Application Priority Data

Dec. 28, 1988 [JP] Japan .................. 63-168384[U]

[51] Int. Cl.⁵ .............................................. A47C 1/00
[52] U.S. Cl. ...................................... 297/343; 297/320
[58] Field of Search .................. 297/15, 14, 61, 312, 297/313, 323, 322, 340, 342, 343, 317, 318, 322, 323, 329, 341; 411/84, 85

[56] References Cited

U.S. PATENT DOCUMENTS

| | | | |
|---|---|---|---|
| 1,414,637 | 5/1922 | Gell | 297/343 |
| 2,182,598 | 12/1939 | Owler | 297/343 |
| 2,249,923 | 7/1941 | Whitcombe | 411/85 |
| 2,634,796 | 4/1953 | Fischer | 297/343 |
| 2,712,346 | 7/1955 | Sprinkle | 297/317 |
| 2,859,797 | 11/1958 | Mitchelson | 297/61 |
| 4,691,961 | 9/1987 | Rogers, Jr. et al. | 297/61 |
| 4,902,069 | 2/1990 | Lehnert | 297/14 |

FOREIGN PATENT DOCUMENTS

| | | | |
|---|---|---|---|
| 45-32323 | 12/1970 | Japan . | |
| 57-11580 | 3/1982 | Japan . | |
| 60-31547 | 9/1985 | Japan . | |
| 0195930 | 10/1986 | Japan . | |
| 1517817 | 7/1978 | United Kingdom | 297/320 |
| 2085719 | 5/1982 | United Kingdom . | |

Primary Examiner—Kenneth J. Dorner
Assistant Examiner—James M. Gardner
Attorney, Agent, or Firm—Foley & Lardner

[57] ABSTRACT

A vehicular seat whose seat back is divided into upper and lower seat backs. The lower seat back is hingedly connected at its lower end section with a seat cushion and at its upper end section with the lower end section of the upper seat back. The upper end section of the lower seat back is slidably supported onto a back panel of a vehicle body through a bracket fixed to the back panel, so that the lower seat back upper end section is slidable along a guide opening formed in the bracket. The upper seat back is also slidably movable along the back panel, following the lower seat back.

11 Claims, 4 Drawing Sheets

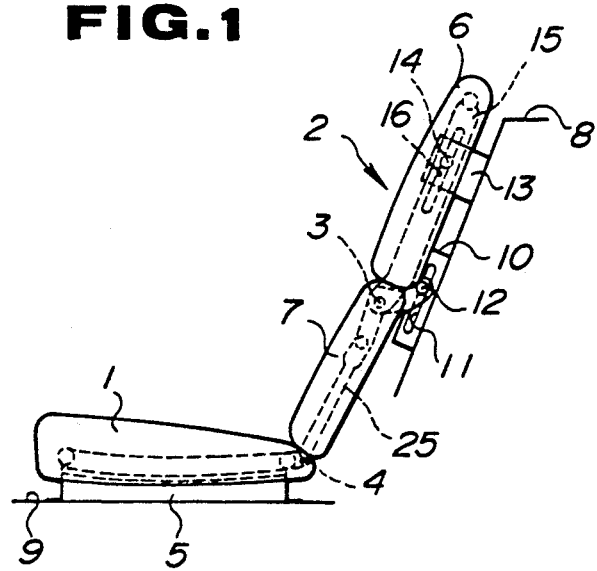
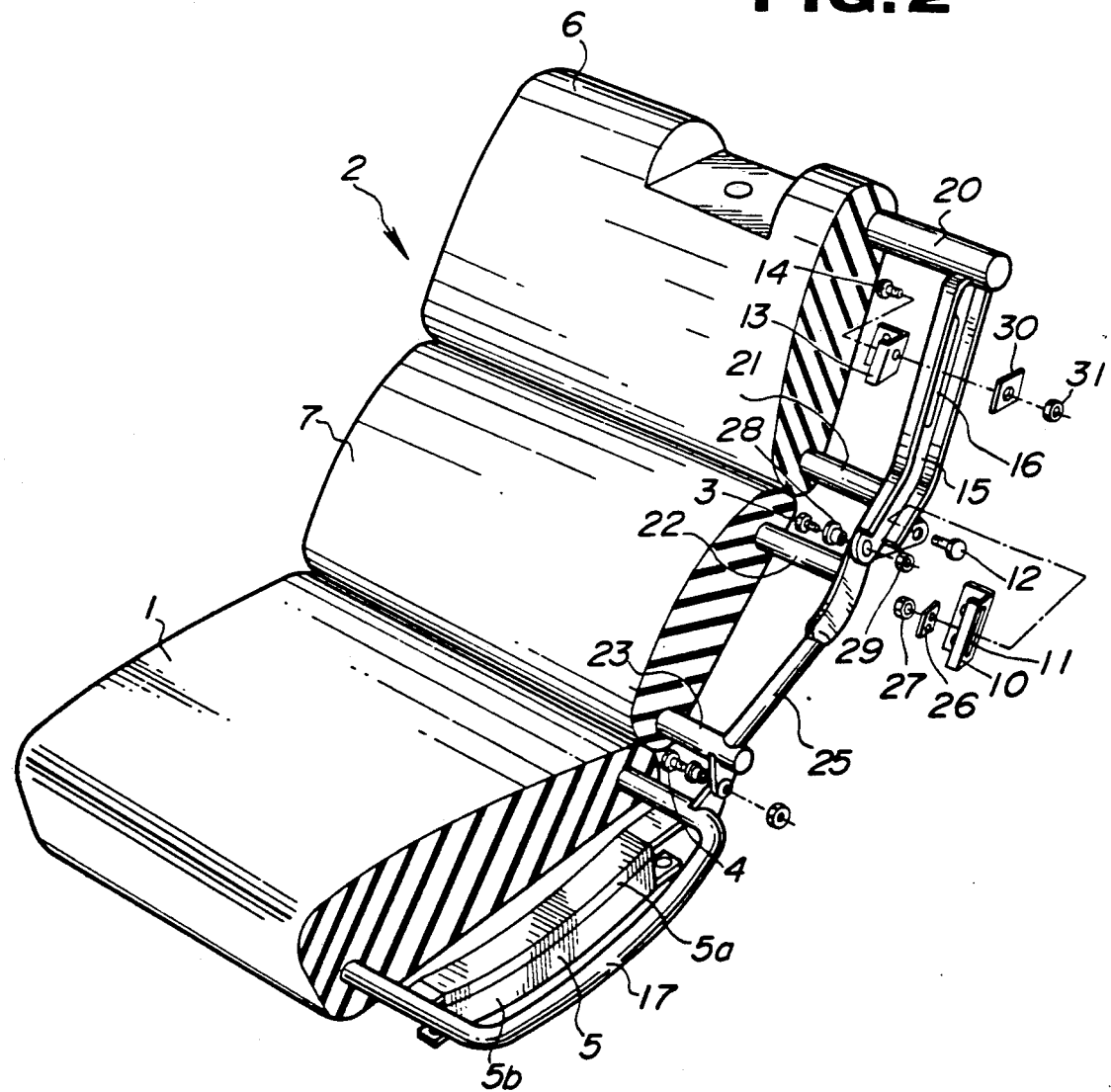

SLIDING SEAT BOTTOM INTERCONNECTED WITH BACK HAVING HINGED UPPER AND LOWER SEAT BACKS

BACKGROUND OF THE INVENTION

1. Field of the Invention

This invention relates generally to a vehicular seat which is adjustable in position forward and rearward of a vehicle body, and more particularly to improvements in a vehicle seat to improve a vehicle passenger's riding comfort and prevent the generation of foreign noises.

2. Description of the Prior Art

It is well known that a seat cushion of a vehicular seat is adjustably movable forward and rearward of a vehicle body. In order to facilitate adjustable movement of the seat cushion, it has been proposed and put into practical use that a seat back hingedly connected with the seat cushion is divided into upper and lower seat backs as shown in FIGS. 7 and 8 of the present application. Such an arrangement is disclosed, for example, in Japanese Utility Model Publication Nos. 57-11580 and 60-31547.

As shown in FIGS. 7 and 8, a seat cushion 1' is adjustably movable forward and rearward of a vehicle along a slide 5' on the floor of the vehicle. A seat back 2' includes upper and lower seat backs 6', 7'. The lower seat back 7' is hingedly connected at its lower end section to the rear end section of the seat cushion 1 through a hinge pin 4', and hingedly connected at its upper end section with the lower end section of the upper seat back 6' through a hinge pin 3'. The upper seat back 6' is slidably connected to a back panel of a vehicle body in a manner to move generally vertical along a guide opening of an adjuster.

In the thus arranged conventional vehicular seat, when the seat cushion 1' is moved forward, the lower seat back 7' is moved forward from a position shown in FIG. 7 to another position shown in FIG. 8, accompanied by movement of the upper seat back 6' in a direction indicated by an arrow. Thus, the lower seat back 7' effectively supports the waist of the vehicle passenger.

However, in such a conventional vehicular seat, the lower seat back is connected with the seat cushion and the upper seat back only through hinges including the hinge pins, so that no secure support is made for lower seat back. As a result, foreign noise is generated at the hinges of the lower seat back because of play or clearance in the hinges, thereby lowering the commercial value of the vehicular seat.

Additionally, Japanese Utility Model Publication No. 45-32323 discloses a vehicular seat of an arm chair type wherein a seat back is divided into upper and lower seat backs. More specifically, a connection shaft between the upper and lower seat backs is provided at a support box for chair arms. The lower seat back is changed in inclination in accordance with the forward and rearward movement of the seat cushion, while the lower seat back is not changed in location and inclination. Accordingly, such a vehicular seat cannot correspond to the postural change of the vehicle passenger.

SUMMARY OF THE INVENTION

It is an object of the present invention to provide an improved vehicular seat capable of suitably corresponding to the postural change of the vehicle passenger while preventing generation of foreign noise due to play of hinges.

Another object of the present invention is to provide an improved vehicular seat having upper and lower seat backs, in which the lower seat back is slidably securely supported to a part of a vehicle body thereby to restricting the movement of the lower seat back particularly at hinges.

A vehicular seat of the present invention is comprised of a seat cushion which is adjustable in position forward and rearward of a vehicle body. A seat back of the vehicular seat includes upper and lower seat backs, the upper seat back being located above the lower seat back. The lower seat back is hingedly connected to the seat cushion. The upper end section of the lower seat back is allowed to slidably move along a first guide opening which extends generally vertical of the vehicle body. The upper end section of the lower seat back is hingedly connected with the lower end section of the upper seat back.

Accordingly, when the seat cushion is moved forward, the lower end section of the lower seat back moves forward while the upper end section of the same moves downward generally vertically along the first guide opening, accompanied by the downward movement of the upper seat back. This changes the form of the vehicular seat, corresponding to the postural change of the vehicular passenger, so that the passenger can be comfortably kept in the vehicular seat. Additionally, the lower seat back to which a higher load is applied is supported at its upper end section onto a vehicle body, thereby reducing the allotment of load to the hinges through which the lower seat back is hingedly connected to the upper seat back. This prevents generation of foreign noise due to play of the hinges.

BRIEF DESCRIPTION OF THE DRAWINGS

FIG. 1 is a side view of an embodiment of a vehicle seat in accordance with the present invention;

FIG. 2 is an enlarged perspective view, partly cut out, of the vehicular seat of FIG. 1;

DETAILED DESCRIPTION OF THE INVENTION

Figure 3:
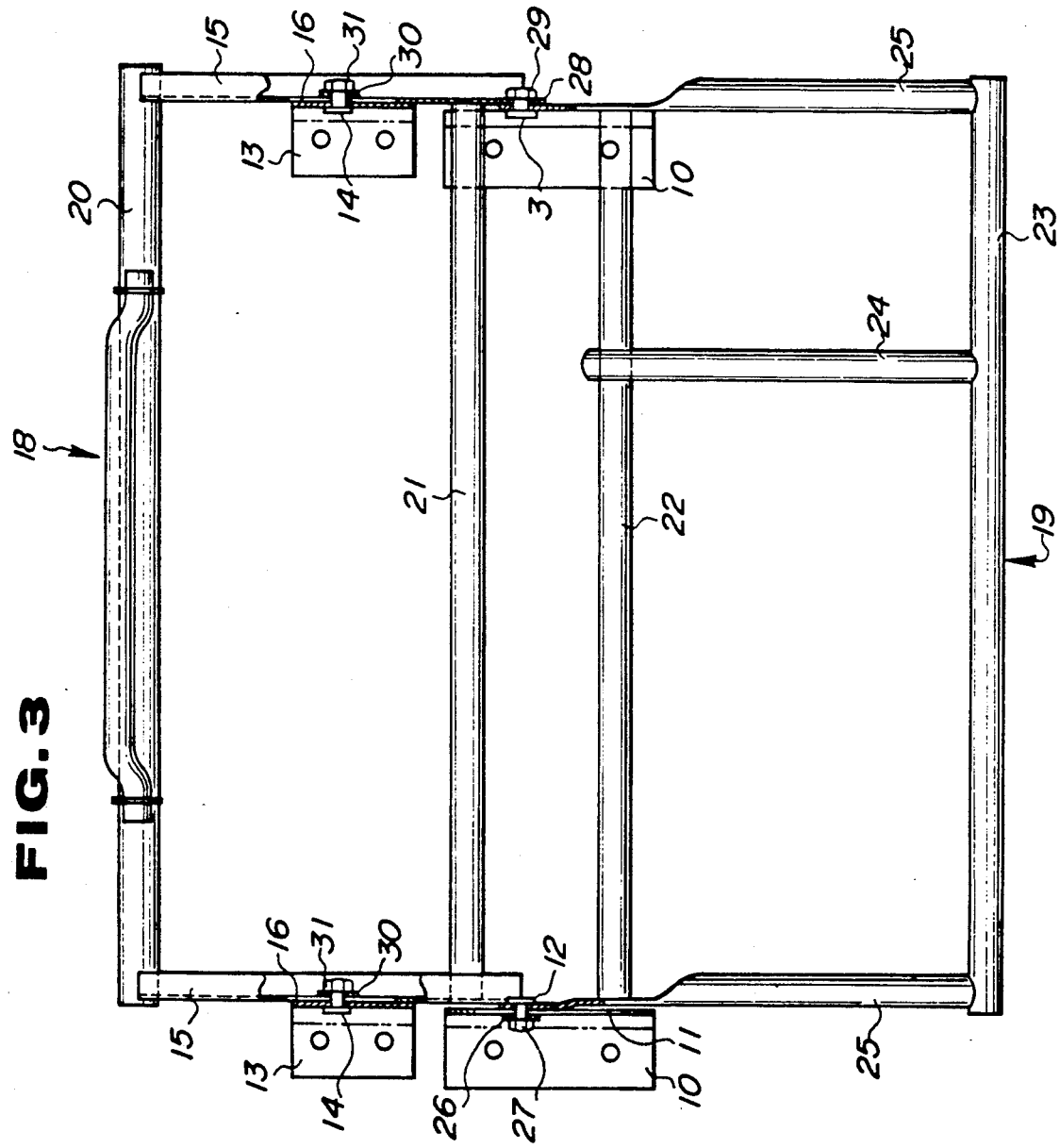
FIG. 3 is a front view of frames of upper and lower seat back of the vehicular seat of FIG. 1.

Referring now to FIGS. 1 to 4 of the drawings, there is shown a first embodiment of a vehicular seat in accordance with the present invention. The vehicular seat is mounted on an automotive vehicle and comprises a seat cushion 1 which is slidably mounted through slides 5 on the floor 9 of the vehicle. The slides 5 extend forward and rearward of the vehicle body. Each slide 5 includes upper and lower counterparts 5a, 5b as shown in FIG. 2. The upper counterpart 5a is formed arcuately and slidably engaged with the lower counter part 5b whose upper part is formed arcuately. Accordingly, the seat cushion 1 is movable forward and backward along the arcuate shape of the slides 5 and adjustable in position.

As shown in FIG. 1, the seat back 2 includes upper and lower seat backs 6, 7 which are movably connected with each other. The upper seat back 6 is located above the lower seat back 7. The upper seat back 6 may be suitably provided with a head rest (not shown) by which a passenger's head is supported. The lower seat back 7 is hingedly connected at its lower end section with the rear end section of the seat cushion 1 through a hinge pin 4 forming part of a hinge (no numeral). Accordingly, the lower seat back 7 is pivotally movable relative to the rear end section of the seat cushion 1. The rear side portion of the upper end section of the lower seat back 7 is provided with a fixed pin 12 which is inserted in and slidable along a first straight elongate guide opening 11. The first guide opening 11 is formed generally vertically and formed in a bracket 10 which is fixedly secured to a vehicle body back panel 8. Additionally, the front side portion of the upper end section of the lower seat back 7 is hingedly connected to the lower end section of the upper seat back 6 through a hinge pin 3 forming part of a hinge (no numeral). Accordingly, the lower seat back 7 is pivotally movable relative to the lower end section of the upper seat back 6.

The upper seat back 6 is fixedly provided with a side frame 15 which is formed with a second straight elongate guide opening 16. A pin 14 is inserted in and relatively slidable along the second guide opening 16. The pin 14 is fixed to a bracket 13 which is fixedly secured to the vehicle body back panel 8. Thus, the upper seat back 6 is guided by the pin 14. The first and second guide openings 11, 16 are arranged generally parallel with each other.

Figure 4:
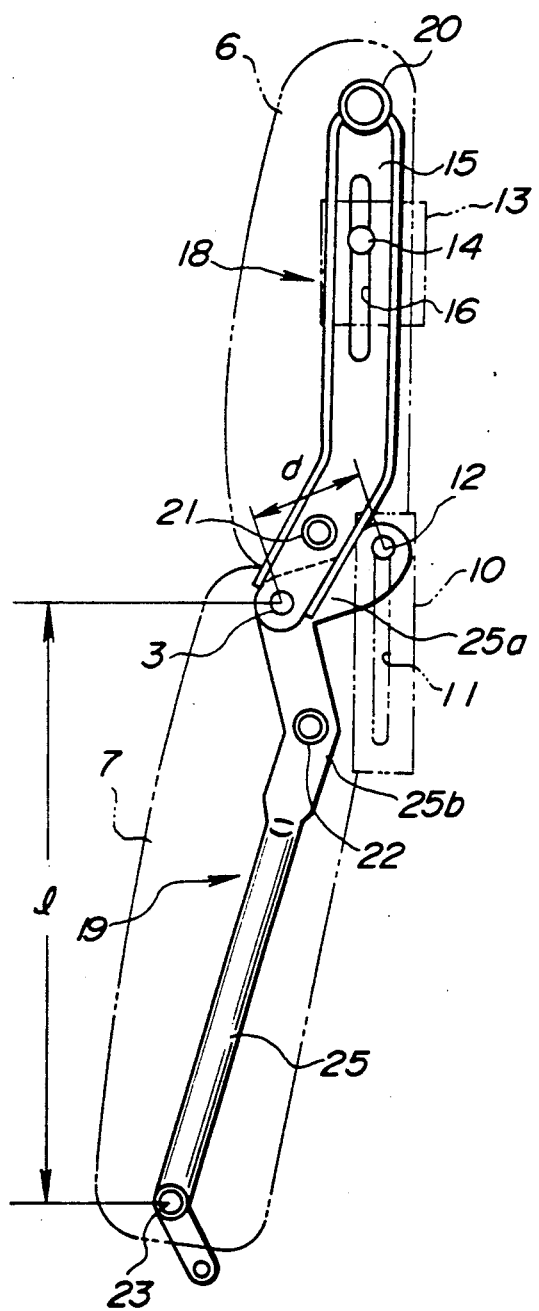
FIG. 4 is a side view of the frames of FIG. 3.
Figure 5:
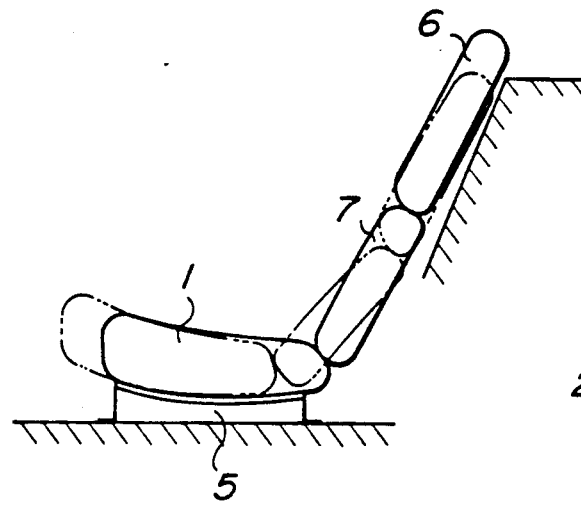
FIG. 5 is a side view of the vehicular seat of FIG. 1, showing a condition changed from that of FIG. 1.

As shown in FIGS. 2 to 4, the seat cushion 1 includes a frame formed of pipes with which a pad (no numeral), a spring (not shown) and a skin (not identified) are incorporated as usual. The seat cushion 1 is supported by the slides 5 and movably mounted on the vehicle floor 9 as discussed above. The frame of the seat back 2 includes upper and lower seat back frames 18, 19 which are hingedly connected with each other through the hinge pin 3, so that the upper and lower seat back frames 18, 19 are rotatably movable relative to each other.

The upper seat back frame 18 of the rectangular shape is constructed by incorporating laterally extending upper and lower pipes 20, 21 with vertically extending side frame members 15, 15. Each side frame member 15 has a generally C-shaped cross-section. The rectangular lower seat back frame 19 is constructed by incorporating the laterally extending upper and lower pipes 22, 23 with vertically extending side frame members 25, 25 and a vertically extending middle pipe 24. Each side frame member 25 is formed of a pipe whose upper part is flattened upon being pressed. The lower end of the lower seat back frame member 19 is hingedly connected to the seat cushion frame 17 through the hinge pin 4 forming part of a hinge (no numeral). The hinge pin 4 is engaged with a nut (no numeral) through a washer (no numeral) as best shown in FIG. 2. Accordingly, the lower seat back frame 19 is rotatably movable relative to the seat cushion frame 17.

As shown in FIG. 4, the side frame member 25 of the lower seat back frame 19 is generally L-shaped at its upper section 25a and slightly bent at its lower section 25b. The pin 12 is fixed to the end portion of the side frame member upper section 5a with a nut 27 through a rectangular plastic washer 26 as shown in FIG. 2. The plastic washer 27 is guided by the bent portion having the generally C-shaped cross-section of the bracket 10. It is to be noted that the distance d between the pins 12 and 3 is fairly short, the distance d being preferably about 1/5 of the distance 1 between the pin 3 and the laterally extending lower pipe 23. The front side portion of the side frame member 25 is connected with the side frame member 15 of the upper seat back frame 18 by screwing the hinge pin 3 into a nut 29 through a bushing 28. The pin 14 is fixed to the vehicle body side bracket 13 with a nut 31 through a rectangular plastic washer 30. The pin 14 is inserted in the second guide opening 16 formed in the upper seat back frame side frame member 15, so that the side frame member 15 is guided by the pin 14. When the side frame member 15 slidingly moves upon being guided by the pin 14, the plastic washer 30 functions as a guide for the bent portion having the generally C-shaped cross-section of the upper seat back frame side frame member 15.

The seat back 2 is fabricated by incorporating a pad, a spring and a skin (not identified) with the above-arranged upper and lower seat back frames 18, 19, as is usual. Although the pad, the spring and the skin are usually incorporated with the upper and lower seat back frames 18, 19 upon being separated into two, it will be understood that the pad and the skin may be used in a one-piece type to cover the upper and lower seat back frames 18, 19, the one-piece type pad and skin being formed with a depression located corresponding to the extension of the axis of the hinge pin 3 to facilitate bending of the pad and the skin.

The manner of operation of the thus arranged vehicular seat will be discussed hereinafter.

When the seat cushion 1 is forced forward along the slide 5 manually or under the action of a motor (not shown), the seat cushion 1 is moved forward in a manner that its front end section slightly rises while the its rear end section slightly falls under the influence of the arcuate shape of the slide 5. As a result, the lower seat back 7 moves forward and slightly falls because of being connected with the seat cushion 1 through the hinge pin 4. Then, the upper end section of the lower seat back 7 pin-connected with the vehicle body side bracket 10 is moved downward, a movement in which the pin 12 is guided along the first guide opening 11. The upper seat back 6 is similarly moved downward because of being connected with the lower seat back 7 through the hinge pin 3. The upper side of the upper seat back 6 is moved downward, the side frame member 15 being guided by the fixed pin 14 on the vehicle body side and relatively slidably movable in the second guide opening 16. As a result, the vehicular seat is brought into a position to maintain a passenger in a relaxed and comfortable condition.

It is to be noted that even if the first and second guide openings 11, 16 are both formed parallel with each other to facilitate production of the vehicular seat, the advance and retreat amount of the lower seat back 7 is smaller and no unpleasant feeling comes out because of the smaller distance d between the pins 12 and 3. Additionally, the upper seat back 6 follows the lower seat back 7, similarly causing no unpleasant feeling.

Under this condition, when the passenger is seated on the vehicular seat, the load of the passenger is applied first to the seat cushion 1 and thereafter to the lower seat back 7 and the upper seat back 6, in which the seat cushion 1 is securely supported by the slide 5 as usual and therefore no problem arises. While the lower end section of the lower seat back 7 to which a larger load is applied is connected to the seat cushion 1 only through the hinge pin 4, the upper end section of the same is connected with the lower end section of the upper seat back 6 through the hinge pin 4 and besides supported through the bracket 10 to the vehicle body back panel 8 which is rigid and stable as compared with the upper seat back 6. As a result, the load applied to the lower seat back 7 is distributed to two locations, thus preventing play of the lower seat back 7 and therefore suppressing generation of foreign noise. Particularly in the above embodiment, the pins 12 and 13 are guided along the respective first and second guide openings 11 and 16 through rectangular plastic washers 26 and 30 which are fitted in the bent portions of the members formed with the guide openings 11 and 16, thereby effectively preventing generation of foreign noise due to play of the parts.

While an explanation has been made only on the arrangement on one side (as shown in FIG. 4) of the vehicular seat, it will be understood that the same arrangement as shown in FIGS. 2 and 4 is disposed on the opposite side of the vehicular seat as seen from FIG. 3.

Figure 6:
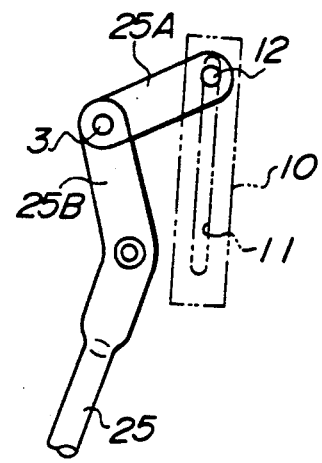
FIG. 6 is a side view of an essential part of another embodiment of the vehicular seat in accordance with the present invention.
Figure 7:
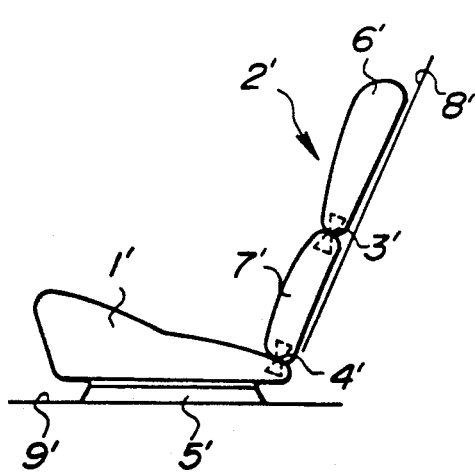
FIGS. 7 and 8 are side views of a conventional vehicular seat, showing two changed conditions thereof.
Figure 8:
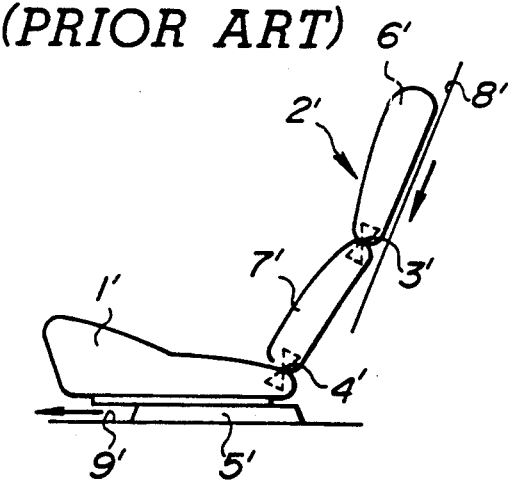

FIG. 6 illustrates another embodiment of the vehicular seat in accordance with the present invention. In this embodiment, the side frame member 25 of the lower seat back 7 includes an upper shorter section 25A and a lower longer section 25B. The upper shorter section 25A is independent from, but connected with, the lower longer section 25B through the hinge pin 3. The hinge pin 12 is slidably disposed within the first guide opening 11 in the vehicle body side bracket 10. It will be understood that the same effect as in the FIGS. 1 to 5 can be obtained.

While the first and second guide openings 11, 16 have been shown and described as being formed straight, it will be understood that they may be formed curved. Although only a locational relationship between the guide pins and the guide openings has been shown and described, it will be understood that a variety of locational relationships therebetween may be employed in accordance with requirements.

What is claimed is:

1. A vehicular seat comprising:
   a set cushion which is adjustable in position forward and rearward of a vehicle;
   a seat back, including upper and lower seat backs, said upper seat back being located above said lower seat back;
   means for hingedly connect said lower seat back with said seat cushion;
   means defining a first guide opening extending generally vertically of the vehicle, said first guide opening means including a bracket fixed to a back panel of a vehicle body, said bracket being formed with said first guide opening;
   means for allowing an upper end section of said lower seat back to slidingly move along said first guide opening when said seat cushion moves forward and rearward of the vehicle, said lower seat back upper end section allowing means including a rigid member securely connected with an upper end section of a frame of said lower seat back and extending backward, and a pin fixed to a free end section of said rigid member, said pin being slidably engaged with said first guide opening; and
   means for hingedly connecting the upper end section of said lower seat back with a lower end section of said upper seat back.

2. A vehicle seat as claimed in claim 1, further comprising:
   means for defining a second guide opening extending generally vertically of the vehicle;
   means for allowing a predetermined section of said upper seat back to slidingly move along said second guide opening, said predetermined section being located above the lower end section of said upper seat back, the upper seat back following the movement of the lower end section.

3. A vehicular seat as claimed in claim 2, wherein said second guide opening defining means includes a side frame member forming part of a frame of said upper seat back, said side frame member being formed with said second guide opening.

4. A vehicular seat as claimed in claim 3, wherein said upper seat back predetermined section allowing means includes a pin fixed to a bracket, the bracket being fixed to a back panel of a vehicle body.

5. A vehicle seat as claimed in claim 1, further comprising means for slidably supporting the upper end section of said lower seat back on a back panel of a vehicle body, whereby the upper end section moves upwardly and downwardly in response to the forward and rearward movement of the seat cushion.

6. A vehicular seat as claimed in claim 1, wherein said seat cushion is mounted on a floor of the vehicle so as to be slidable on the floor.

7. A vehicular seat as claimed in claim 6, wherein said seat cushion sliding means is formed in an arcuate shape and is mounted on the floor of the vehicle so as to extend forward and rearward of the vehicle.

8. A vehicular seat as claimed in claim 1, further comprising means for allowing said seat cushion to slidingly move forward and rearward.

9. A vehicular seat as claimed in claim 1, wherein said bracket extends in a straight and has a generally C-shaped cross-section to form a guide rail.

10. A vehicular seat as claimed in claim 9, wherein said lower seat back upper end section allowing means includes a washer mounted on said pin and slidably engaged with said guide rail having the generally C-shaped cross-section.

11. A vehicular seat as claimed in claim 1, wherein said lower seat back upper end section allowing means includes a backward extending rigid member securely connected with an upper end section of a frame of said lower seat back, said pin being fixed to a free end section of said rigid member.

* * * * *